United States Patent [19]
Richards et al.

[11] Patent Number: 5,171,366
[45] Date of Patent: Dec. 15, 1992

[54] GYPSUM BUILDING PRODUCT

[75] Inventors: Turner W. Richards, Conyers; Hubert C. Francis, Lithonia; George F. Fowler, Norcross, all of Ga.

[73] Assignee: Georgia-Pacific Corporation, Atlanta, Ga.

[21] Appl. No.: 420,362

[22] Filed: Oct. 12, 1989

[51] Int. Cl.⁵ .............................................. C04B 11/06
[52] U.S. Cl. ................................. 106/772; 106/773; 106/780; 428/920; 428/921
[58] Field of Search .............. 106/772, 773, 775, 780, 106/782; 428/920, 921; 156/39, 42, 45

[56] References Cited

U.S. PATENT DOCUMENTS

| | | | |
|---|---|---|---|
| 2,076,349 | 9/1934 | Porter et al. | 106/780 |
| 2,322,194 | 6/1943 | King | |
| 2,882,175 | 4/1959 | Bailly | |
| 2,913,308 | 11/1959 | Dailey | |
| 3,376,147 | 4/1968 | Dean | |
| 3,390,003 | 6/1968 | Cooper | |
| 3,839,059 | 10/1974 | Rothfelder et al. | |
| 3,951,735 | 4/1976 | Kondo et al. | |
| 4,047,962 | 9/1977 | Copeland | |
| 4,127,628 | 11/1978 | Uchida et al. | |
| 4,159,302 | 6/1979 | Greve et al. | |
| 4,174,230 | 11/1979 | Hashimoto et al. | 106/780 |
| 4,214,027 | 6/1980 | Knauf et al. | |
| 4,222,984 | 9/1980 | Ladwig | |
| 4,239,716 | 12/1980 | Ishida et al. | |
| 4,252,568 | 2/1981 | Bounini | |
| 4,328,178 | 5/1982 | Kossatz | |
| 4,557,973 | 12/1985 | Ali | |
| 4,645,548 | 2/1987 | Take et al. | |
| 4,734,163 | 3/1988 | Eberhardt et al. | |
| 4,748,771 | 6/1988 | Lehnert et al. | |
| 4,810,569 | 3/1989 | Lehnert et al. | |
| 4,811,538 | 3/1989 | Lehnert et al. | |
| 4,840,688 | 6/1989 | Vogt | 106/780 |

FOREIGN PATENT DOCUMENTS

| | | |
|---|---|---|
| 2365161 | 7/1975 | Fed. Rep. of Germany |
| 84216 | 7/1977 | Japan |
| 92836 | 8/1978 | Japan |
| 134814 | 11/1978 | Japan |
| 106559 | 7/1982 | Japan |
| 165615 | 9/1984 | Japan |
| 171261 | 9/1985 | Japan |
| 1217840 | 3/1986 | U.S.S.R. |

OTHER PUBLICATIONS

"Inorganically Bonded Wood," A. A. Moslemi, *Chem. Tech.*, Aug. 1988, pp. 504-510.

*Primary Examiner*—William R. Dixon, Jr.
*Assistant Examiner*—Paul Marcantoni
*Attorney, Agent, or Firm*—Synnestvedt & Lechner

[57] ABSTRACT

Compositions containing nonfibrous calcium sulfate in hemi-hydrate or anhydrous form and fibrous additives, including paper fibers preferably derived from waste newspaper, capable of being formed into an unfaced building material having superior mechanical properties and/or fire resistance.

34 Claims, 6 Drawing Sheets

GYPSUM BUILDING PRODUCT

This invention is in the field of building materials, especially fire-resistant building materials which contain gypsum in combination with certain fibrous additives, including paper fiber, as well as methods for producing such materials and to articles which incorporate them, such as fire doors.

BACKGROUND OF THE INVENTION

Various products containing the naturally-occurring mineral, gypsum, have been developed for the building trades. Especially notable are various gypsum wall board products, e.g., sheet materials typically faced with paper. Desirable characteristics of such products include their strength at relatively low density (about 0.7 gm cm$^3$), ease of handling and fabrication, and low cost. In producing gypsum building products, calcined gypsum, i.e., anhydrous or hemi-hydrate (CaSO$_4$.$\frac{1}{2}$H$_2$O), known also as stucco, plaster of Paris, molding plaster, building plaster, and the like, typically in an aqueous slurry, is cast, molded, and dried. During the course of this process, the calcined gypsum is further hydrated, yielding CaSO$_4$.2H$_2$O.

Although the hydration adds only about 20% to the weight of the calcined gypsum, excess water generally is present in the slurry to decrease the viscosity and facilitate molding. However, the excess water is undesirable in other respects. For example, it must be removed in subsequent processing of the product, at considerable cost. Furthermore, the resultant dried product is of low density and compressive strength. Consequently, it is conventional wisdom in the art that the amount of water should be held to a minimum, and various additives and treatments have been proposed to fluidize the slurry, but minimize the water; e.g., U.S. Pat. Nos. 2,913,308; 4,222,984; and 4,252,568. "Dry" or "semi-dry" processes have been described in which water required for the hydration chemistry is supplied by a water-saturable filler, such as wood shavings, wood fiber granulate and bark; e.g., U.S. Pat. No. 4,328,178. In this regard, the article entitled "Inorganically Bonded Wood" by A. A. Moslemi, *Chem. Tech.*, August 1988, pp 504-510, summarizes the state of the art.

A number of building materials have been disclosed in which substantial quantities of cellulosic fillers, including wood particles and fibers, have been included in gypsum-containing products, not only as aids to incorporating the water necessary to hydrate the gypsum, but also to strengthen and otherwise upgrade the mechanical properties of the product. For example, U.S. Pat. No. 3,951,735 discloses a strengthened gypsum wallboard material having a density of 1.1-1.6 gm/cm$^3$ (obtained by compressing a lamination) which includes calcined gypsum and cellulosic fiber such as paper pulp, but the criticality of also including a substantial amount of asbestos fiber is pointed out. Similarly, U.S. Pat. No. 4,127,628 discloses a multi-layered gypsum product of low density (0.3-0.9 gm/cm$^3$) which includes glass fibers and optionally also contains pulp and polyvinyl alcohol, but, in addition, a substantial amount of asbestos fiber. Products which require asbestos to attain superior properties are difficult to justify in view of the environmental and health hazards associated with such products.

U.S. Pat. No. 4,239,716 describes a gypsum-containing building product containing a reinforcing agent which may be wood pulp or glass fibers, together with a binder, such as polyvinyl acetate. However, the disclosure is limited to the use of fibrous alpha-calcium sulfate hemihydrate, a very expensive raw material, requiring special conditions to produce, which is difficult to reconcile if equivalent properties could be obtained in a product which employs common and inexpensive non-fibrous forms of calcined gypsum.

Gypsum building materials generally are held in high regard for use in fire-resistant construction. The spread of fire and the penetration of flame through set gypsum structures is delayed, because impinging heat initially operates to reverse the hydration reaction, recalcining the gypsum, liberating water. The liberated water is an additional energy sink, absorbing its heat of vaporization. Finally, however, although the gypsum doesn't burn, it shrinks and cracks when heated in a flame. It is known that this tendency to crack can be countered with appropriate additives, such as fiber, especially glass textile fibers, which hold the structure together, and raw vermiculite, which expands when heated, counteracting the gypsum shrinkage. With this knowledge, a number of gypsum-containing products have been developed in which fire-resistance is critical. Such products include fire doors, for example.

Fire doors may be of either the panel or flush types. They include facings on the two major surface, and the core of the door may either be solid or at least partially hollow. Edge banding is included around the door periphery for aesthetic or structural reasons.

Fire doors, as used in residential, commercial and industrial applications, are typically employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the fire wall for a limited time to permit the occupants of a building to escape and to delay the spread of the fire until fire control equipment can be brought to the scene.

Various tests have been devised for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards, and these standards are incorporated into building codes and architectural specifications. One such standard, ASTM Method E 152, requires a door to maintain its integrity for periods ranging up to 1.5 hrs. while withstanding progressively higher temperatures and the erosive effects of a high pressure fire hose at the conclusion of the fire exposure.

Considerations in fire door design, in addition to retarding the advance of a fire, include the cost of raw materials and the cost of fabrication. Furthermore, the weight of the door is important, both from the standpoint of ease in handling and the cost of transportation. The strength of the door is also a significant factor, since fire doors must pass the previously noted water stream tests as well as have the requisite structural strength to withstand normal use and abuse.

Fire-resistant doors have been made in a variety of constructions utilizing a number of different materials, including wood, metal and mineral materials. Early forms of fire doors simply comprised wooden cores faced with metal sheeting. Although wood of ample thickness is an effective fire and heat retardant, doors of such construction tended to be heavy and were expensive to fabricate and transport.

Mineral materials have also been employed in the manufacture of fire doors. The core of a commercial metal fire door principally comprises a composition including mineral fibers and a binder. Such doors suffer, however, from a jack of strength, and handling the friable cores results in the production of irritating dust particles during the manufacturing process.

It has also been proposed to make fire doors wherein the core comprises particles of expanded perlite which are bound together by the use of various hydraulic binders including gypsum, cement and inorganic adhesive material. In order to provide sufficient strength, particularly to withstand handling of the core during manufacture, the core is compressed to compact the mixture to a relatively high density, resulting in a heavy door.

Other fire doors have included conventional gypsum wallboard panels as a core material. However, in order to provide sufficient fire resistance, the thickness required of the wallboard is such as to result in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire-resistant door.

U.S. Pat. No. 4,159,302 discloses a set gypsum-containing composition which is especially useful as the core in a solid core fire door, and U.S. Pat. No. 4,811,538 describes a fire door which is partially hollow but has a core of set gypsum faced with fibrous mats. U.S. Pat. No. 4,748,771 discloses set gypsum-containing edge banding for use in fire doors.

The state of the art edge banding described in U.S. Pat. No. 4,748,771 is of tripartite construction, in that it includes in lamination, an inner strip comprising a cast gypsum mixture, an intermediate fiber-reinforced plastic strip, and an outer strip of natural wood. Such edge banding is surprisingly complex and correspondingly expensive. The complexity is necessary at least in part, because the combination of the gypsum and wood strips alone does not provide the screw-holding capacity required for hinges, latch mechanism, etc.; the thin plastic strip is necessary solely for that reason. The gypsum strip included in the edge banding includes gypsum, glass fiber, raw vermiculite, and clay, together with a small amount of paper fiber less than 2% by weight), wood chips, and a resin binder, which may be polyvinyl acetate.

In summary, the available gypsum building materials which have the superior mechanical and fire-resistant properties required in technically advanced products such as fire doors often require expensive and potentially hazardous additives, such as asbestos, to achieve those properties. Thus, it is an object of the present invention to provide novel gypsum compositions including safe and inexpensive components from which superior building materials can be made. It is another objective of the invention to provide a process for making such superior building materials from the novel compositions. Yet another objective is the provision of gypsum building materials having superior mechanical and fire-resistant properties. It is still another objective to provide novel fire doors which incorporate the novel building materials.

SUMMARY OF THE INVENTION

Consequently, this invention provides in one aspect a composition for preparing fire-resistant structural building materials having density of at least about 60 lbs./cu. ft., flexural strength, measured as defined hereinafter, of at east about 40 lb. (½ in. thick material), and screw-holding capacity, measured as defined hereinafter, of at least about 400 lbs. The building material does not require facing, but, if desired, may be faced with any suitable material such as, for example, the paper facing commonly employed in gypsum wallboard, or glass mat facing, for example, as described in U.S. Pat. No. 4,810,569, or a decorative overlay. The composition from which the building material is made comprises an aqueous dispersion of solids which includes by weight about 53% to about 78% calcium sulfate, about 7% to about 30% cellulosic fiber, and preferably about 1.5% to about 35% performance booster selected from inorganic fiber, clay, vermiculite and binder polymer, together with a quantity of water at least about 25-fold in excess of that required to completely hydrate the calcined gypsum.

In other aspects, this invention provides a process for manufacturing a fire-resistant set gypsum structural building material which exhibits the aforesaid properties, as well as certain building materials per se which possess some or all of the aforesaid characteristics. In additional aspects, the invention provides fire doors which meet specific fire resistance criteria.

Another aspect of the present invention involves a method for manufacturing an asbestos-free structural building material from calcium sulfate and paper fiber in which the paper fiber is combined with the calcium sulfate in the form of a pulp of paper stock that contains at least about 20 times more water than paper stock.

There are many advantages associated with the practice of the present invention. In addition to providing practical and economical means for producing a product which has excellent functional characteristics, the invention can be practiced in a manner such that important and desirable environmental benefits can be realized. Thus, as explained hereinbelow, sources of essential constituents which comprise the product of the present invention can be scrap- or waste-like materials which in this day and age are generally considered to be the cause of expensive waste disposal problems. The present invention allows such materials to be put to good use.

This invention will be understood more completely by reference to the drawings, which disclose preferred embodiments of the invention containing certain optional features, and to the detailed description which follows.

DETAILED DESCRIPTION OF THE INVENTION

Figure 1:
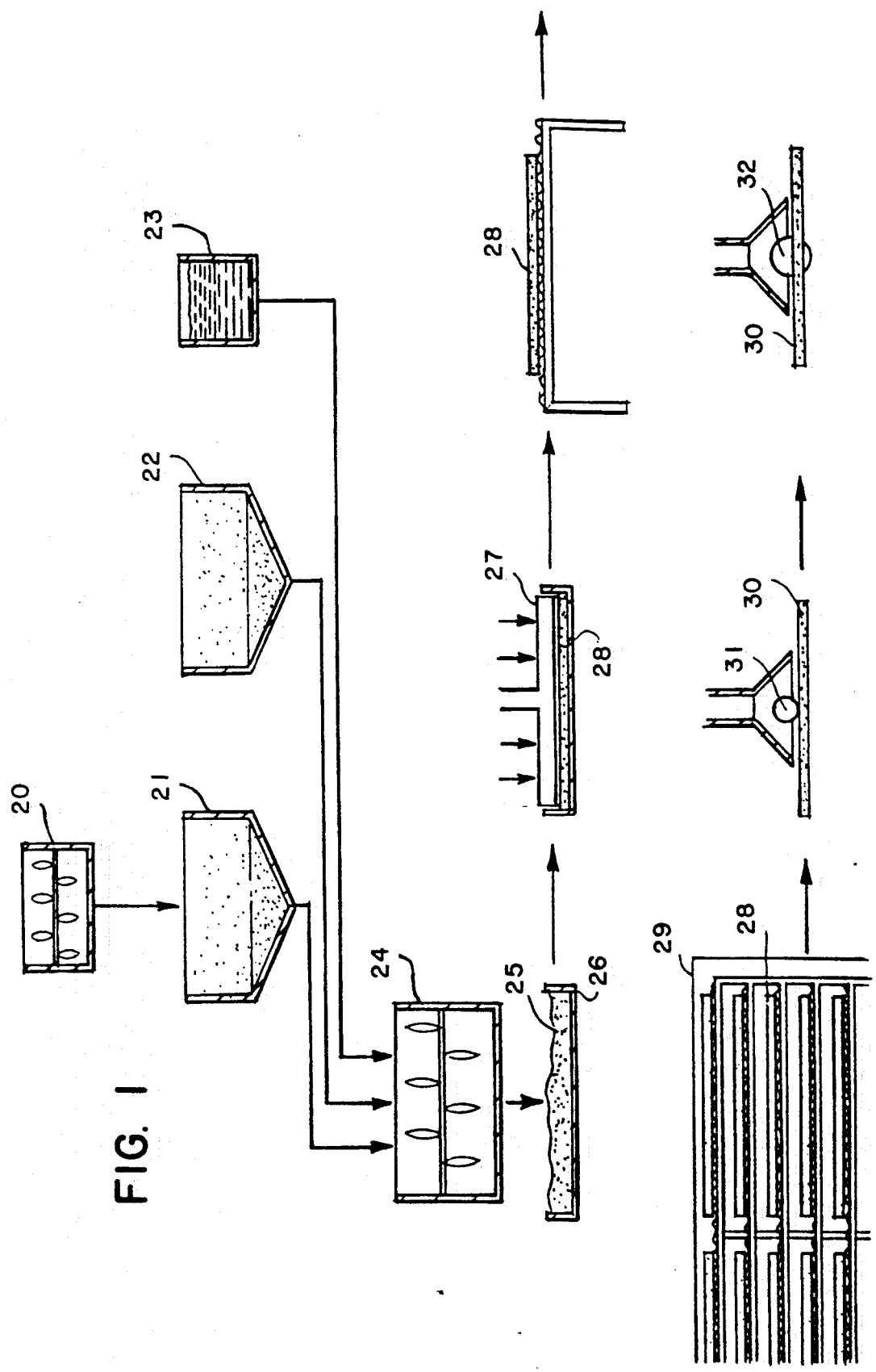
FIG. 1 is a flow diagram which describes the process of this invention by which the building materials can be made.

One of the essential constituents comprising the product of the present invention is calcium sulfate dihydrate. This constituent is derived from the hydration of any form of calcium sulfate which is in non-fibrous form and which is capable of reacting with water to form set gypsum, that is, calcium sulfate dihydrate. Thus, the calcium sulfate can be in anhydrous form or in the hemihydrate form. It is believed that the hemihydrate form of calcium sulfate will be used most widely. Of the α and β forms of the hemihydrate, use of the latter is preferred. The hemihydrate can be produced from the naturally-occurring gypsum mineral by heating, or calcining, the dihydrate.

For many applications, it is not important to inquire into the crystalline form of the hemihydrate; however, with respect to this invention, that is not the case. It is known that calcium sulfate hemihydrate can exist in two different crystalline forms, namely a non-fibrous form and a fibrous form, for example, elongated needles, such as the fibrous alpha-calcium sulfate hemihydrate disclosed in U.S. Pat. No. 4,239,716. In the practice of this invention, there is used a non-fibrous form of calcium sulfate capable of reacting with water to form set gypsum. It should be understood, however, that a minor amount of a fibrous form of gypsum can be used as an optional constituent.

As mentioned above, one of the advantages of the present invention is that waste-type materials can be used in the practice of the present invention. For example, there can be used as the source of the calcium sulfate the material known as "desulfurized by-product gypsum" which is produced by the desulfurization of flue gas. Another example of a waste- or scrap-type material that can be used in the practice of the present invention is scrap gypsum wall board, which can be used as a source of both calcium sulfate and the paper constituent of the building product. For this purpose, scrap paper-faced gypsum wallboard can be ground into suitably small particles which are calcined in water under pressure and in the presence of a crystal modifier to form non-fibrous α calcium sulfate hemi-hydrate. Scrap gypsum wallboard can also be transformed into a suitable material for use in the practice of the present invention by grinding and calcining it at atmospheric pressure. Sufficient water can be used to form the desired pulp-type material from which the product is conveniently made.

A mixture of the different sources of calcium sulfate can be used in the practice of the present invention.

In the use of an aqueous dispersion to make the building product of the present invention, the nonfibrous calcium sulfate generally will comprise between about 53% and about 78% by weight of the total solids, preferably between about 55% and about 70% by weight, depending upon the specific application for the resultant building material. For example, in a building board to be employed as edge banding in a fire door, the nonfibrous calcium sulfate content of the dispersion may be in the range of about 54% to about 62% by weight of the solids. On the other hand, in a building panel to be used as the facing on a fire door, the calcium sulfate content of the dispersion may lie between about 60% and about 80% by weight of the solids.

The gypsum dihydrate content of the building materials and products of this invention will be approximately 18.5% greater than the nonfibrous calcium sulfate content of the compositions from which they are made, the difference representing the added water of hydration in the set gypsum dihydrate. That is, by weight, the set gypsum will comprise between about 65% and about 90%, preferably between about 70% and about 85%. In a building board for use as edge banding in a fire door, the set gypsum dihydrate may comprise between about 68% and about 78% by weight. In a building panel intended for use in fire door facings, the set gypsum may comprise between about 75% and about 90% by weight.

The composition, process, building material and product aspects of this invention also employ substantial amounts of cellulosic fiber. Cellulosic fiber includes the fibrous component of plants, such as cotton, linen, and flax, for example. Among the various sources of cellulosic fiber, paper stock is conveniently employed. That is, the solid component involved in each of the aforesaid aspects of the invention includes by weight about 7% to about 30% paper fiber, preferably between about 10% and about 17%. Building materials intended for use in various specific products may contain somewhat different amounts of paper fiber. For example, a building board intended for use as edge banding in a fire door may contain about 15% paper fiber by weight, while a panel intended to be used as fire door facing may contain somewhat less, e.g., about 12% or 13%. The presence of the paper fiber makes it possible to produce building materials having good physical characteristics such as flexural strength, screw holding and surface hardness without having any separate surfacing membrane such as the paper surfacing on conventional gypsum board.

The paper fiber can be derived from either virgin paper stock, or previously used, waste paper stock can be employed. The source of the paper can be wood, cotton or linen rags, straw, etc., the origin or history of the paper not being important factors. The paper may be a product of the sulfite process, the sulfate (Kraft paper) process, or other processes. Among the types of paper stock that have been successfully employed are virgin and brown Kraft papers and, especially, newsprint. Waste newspaper provides very satisfactory results, is inexpensive, and its use helps to overcome an environmental pollution problem. And, as mentioned hereinabove, the source of the paper stock can include the paper of ground paper-faced gypsum wallboard.

Products within the scope of this invention desirably and preferably include one or more performance boosting additives, their specific nature depending to some extent on the intended utility of the final product. In almost every case, there will be desirably used one or more defoaming agents, dispersants and accelerators, ingredients which are well known in the art and are employed at low concentration levels, generally each at less than about 1% by weight of the solids. In the aggregate, the performance booster generally will comprise about 1.5% to about 35% by weight of the solids and will preferably be selected from inorganic fiber, clay, vermiculite, and binder polymer.

Inorganic fiber, as that term is employed herein, includes glass textile fiber and mineral wool. These latter terms are defined in U.S. Pat. No. 4,557,973, and those definitions are incorporated herein by reference. Briefly, the term "mineral wool" means glass or other mineral fibers prepared by attenuating a melt of glass, basalt, blast furnace slag or other vitreous mineral composition from the face of a heated centrifugal rotor or the like. This process is in contrast to that used to produce textile fibers, where the melt is drawn through an orifice. An especially useful and readily available type of mineral wool is glass wool as found in glass wool insulation material. Glass textile fiber and glass wool, jointly or severally, are referred to herein as siliceous fiber. As employed in this invention, the glass textile fiber generally will be chopped, e.g., the fibers may be about ½ inch long.

The composition, process, building materials and specific products of this invention preferably include siliceous fiber. Siliceous fiber improves the fire resistance of the building materials and products of this invention, apparently by decreasing the tendency of the gypsum construction to crack under thermal stress. The siliceous fiber comprises up to about 7% by weight and may include glass textile fiber and, in addition, glass wool, depending upon the specific product. For example, a building board intended for use as edge banding in a fire door preferably includes up to about 7% by weight glass textile fiber, most preferably about 2% by weight glass textile fiber, glass wool being unnecessary. However, a building panel intended to be used as facing on a fire door preferably includes about 0.8% to about 2% siliceous fiber, most preferably a combination of about 0.4% chopped glass textile fiber and about 0.5% to about 1.5% glass wool by weight.

The performance booster may also include either clay or vermiculite, or both, especially if the intended building material or product requires excellent fire resistance. Both of these materials may be present in amounts up to about 6%, preferably about 3-4% by weight of the solids. The clay to be employed will generally be kaolin clay, which is effective to control the shrinkage of the gypsum-containing construction under extreme heat. The vermiculite should be raw, or unexpanded vermiculite, which swells when heated, helping to control shrinkage of the construction and possible cracking. The requirement for the presence of these materials depends somewhat on the intended use for the final product and may not be necessary in, e.g., a building panel intended for use as facings in a fire door.

The composition of this invention, as well as the process for employing that composition to make building materials and specific products within the scope of this invention, may also include binder polymer. The binder polymer affects the physical properties of the building materials and products, especially their flexural strength, and also permits good fastener retention at lower density. Furthermore, the binder polymer improves the surface characteristics of the product, such as smoothing the surface and making it easier to finish.

The binder polymer, when present, may comprise up to about 15% by weight of the solids, but preferably about 1% to about 3% by weight. A number of different polymeric materials may be employed as binder polymer, including homopolymers, such as poly(vinyl acetate) and polyacrylate, as well as copolymers, such as poly(ethylene)-co-(vinyl chloride), poly(styrene)-co-(butadiene), and poly(vinyl acetate)-co(methyl acrylate). Among the various binder polymer possibilities, esters of poly(vinyl alcohol) are especially effective, and poly(vinyl acetate) homopolymer is preferred. It is also convenient in most cases to introduce the binder polymer as an aqueous emulsion, many of which are commercially available.

The composition of this invention will also include water in an amount in vast excess of that required to react with and hydrate the calcined nonfibrous gypsum. That is, at least about a 25-fold excess amount of water should be present. Contrary to the conventional wisdom, the excess water provides processing advantages and leads to products which possess superior properties.

Although the composition of this invention may be formulated in many different ways, and any number of different techniques may be employed to produce the building materials of this invention, a process which is preferred for making these materials is illustrated diagrammatically in FIG. 1. With reference now to FIG. 1, the paper fiber component, e.g., newspaper, together with water, at least about 20 times as much water by weight as paper, are added to pulper 20, and the mixture is reduced to pulp, producing a substantially homogeneous suspension. Glass wool, if it is specified in the composition, can be separately pulped in at least about 20 times its weight of water and the separately pulped wool and paper combined. Alternatively, the paper and glass wool can be pulped together, if desired, in at least about 20 times their combined weight of water. Any textile glass fiber, clay and vermiculite called for are then added to the pulper and thoroughly mixed and incorporated into the suspension. The suspension is then transferred to tank 21.

As needed and required for the composition, pulped suspension from tank 21 is added to mixer 24, any polymer binder from tank 22 as may be required for the composition is added to mixer 24, and sufficient nonfibrous calcium sulfate to yield the requisite amount of dihydrate when reacted with less than about 5% of the water is added from tank 23 to mixer 24, wherein all the components are mixed and incorporated into the suspension, producing a slurry.

The wet slurry 25 is then cast into mold 26, and the slurry is pressed under hydraulic press 27, dewatering the slurry and producing a green casting 28. The pressure employed determines the density of the final product, densities in the range of about 40 lbs./ft$^3$ to about 75 lbs./ft$^3$ being readily attained. For most applications a density of at least about 60 lbs./ft$^3$ is preferred.

The green casting is then conveyed into oven 29, where the gypsum is set, and the set casting is dried. If desired, dried set casting 30 may be sanded at sanding station 31 to the desired thickness and/or then cut to the desired size at saw 32. It will be evident the aforesaid steps can be adapted to either a batch or continuous process.

Another preferred process for manufacturing product within the scope of the present invention is a continuous process in which the aforementioned aqueous dispersion of constituents is formed into a sheet of indefinite length by use of standard paper-making techniques. For example, the aqueous dispersion of constituents can be fed from a head box of the type associated with a paper-making machine to a foraminous moving belt through which water drains as the mass of solids coagulates and sets. The resulting composite sheet is consolidated by passing through press rolls. Heated rollers can be used to dry the sheet.

The process of the present invention can be used to make an unsupported (unfaced) product which has a substantially uniform and homogeneous composition throughout its thickness. The term "unfaced" is used herein to mean that the product is not faced with a sheet material, for example, of the type that is used as a facing material for gypsum wallboard—paper and glass fiber mat being examples of such facing materials. It should be understood, however, that the product of the present invention can be faced with such materials, if desired.

As mentioned above, it is preferred that the building material of the present invention have a density of at least about 60 lbs./cu. ft., but that the material can have a density of as low as 40 lbs./cu. ft. In order to achieve flexural strength and screw-holding capacity having the values referred to above (40 lbs. and 400 lbs. respectively) in building materials having densities below 60 lbs. (cu. ft., there should be included in the composition from which the building material is made relatively high amounts of binder polymer, for example, about 25 to about 35 wt. % based on solids content. For applications where such flexural strength characteristics and screw-holding capacity are not considered important, the use of such binder polymer can be in smaller amounts or avoided. Ceiling tiles are an example of such an application. Density of the building material can be controlled by use of pressure in forming the product and/or by use of a low-density material, for example, expanded perlite.

Table I presents data obtained in producing building materials using the aforesaid process and various cellulosic fibers. All samples were pressed at 300 psi in a 4"×4" mold. Samples were removed from the mold after pressing, hydrated, and dried at 110° F. The samples were then sanded to about 0.3" thick, cut to 1" wide X 4" long and tested for flexural on 3" centers. As reported in Table I below, the various cellulosic fibers used in forming the building materials comprise either wood chips which are pulped (comparative example) or paper stock which is pulped, the paper stock comprising either newspaper, Kraft paper, sulfite paper or paper of the type used to face wallboard. The significant improvements achieved by using the pulp of paper stock relative to the use of wood pulp are evident from the results reported in Table I.

TABLE I

FIBERBOARD SAMPLE DATA

|  | Cellulosic Fiber | | | | |
| --- | --- | --- | --- | --- | --- |
|  | Newspaper | Kraft | Wood Pulp | Sulfite | Wallboard |
| Weight of Water (g) | 500 | 500 | 500 | 500 | 500 |
| Weight of fiber material (g) | 20 | 20 | 20 | 20 | 20 |
| Time to vortex (sec) | 24 | 291 | 0 | 191 | 377 |
| Weight of Pulp Solution (g) | 508.9 | 505.6 | 512.3 | 512.7 | 511.3 |
| Weight of Gypsum (g) | 113 | 113 | 113 | 113 | 113 |
| Weight in mold prior to press (g) | 616 | 611.7 | 620.3 | 618.2 | 614.5 |
| Water/gypsum off before press (g) | 267.5 | 265.7 | 383.9 | 273.2 | 289 |
| Water/gypsum off during press (g) | 159.7 | 158.7 | 98.7 | 142.6 | 137.3 |
| Gypsum lost before press (g) | 2.82 | 5.47 | 36.59 | 5.07 | 1.33 |
| Gypsum lost during press (g) | 0.61 | 0.73 | 4.02 | 0.74 | 0.3 |
| Total water lost during press (g) | 423.77 | 418.2 | 441.99 | 409.99 | 424.67 |
| Weight of sample-wet (g) | 180.98 | 179.7 | 126.7 | 177.28 | 183.12 |
| Weight of sample-dry (g) | 137.74 | 134.41 | 84.78 | 134.71 | 139.52 |
| Water lost during drying (g) | 43.24 | 45.29 | 41.92 | 42.57 | 43.6 |
| % mixture actually in sample | 97.3 | 96.6 | 98 | 97.7 | 97.1 |
| % total water lost before drying | 87.8 | 87.9 | 98.5 | 85.1 | 87.8 |
| % total gypsum lost before drying | 0.031 | 0.057 | 36.7 | 0.053 | 0.015 |
| Weight of 1" sample (g) | 25.4 | 24.92 | 15.59 | 26.66 | 24.52 |
| Caliper of 1" sample (in) | 0.318 | 0.321 | 0.314 | 0.322 | 0.319 |
| Density of 1" sample (lb/in$^3$) | 73.187 | 71.731 | 46.352 | 76.52 | 70.498 |
| Flexural strength (lbs) | 40.44 | 45.3 | 1.05 | 50.23 | 29.67 |

Figure 2:
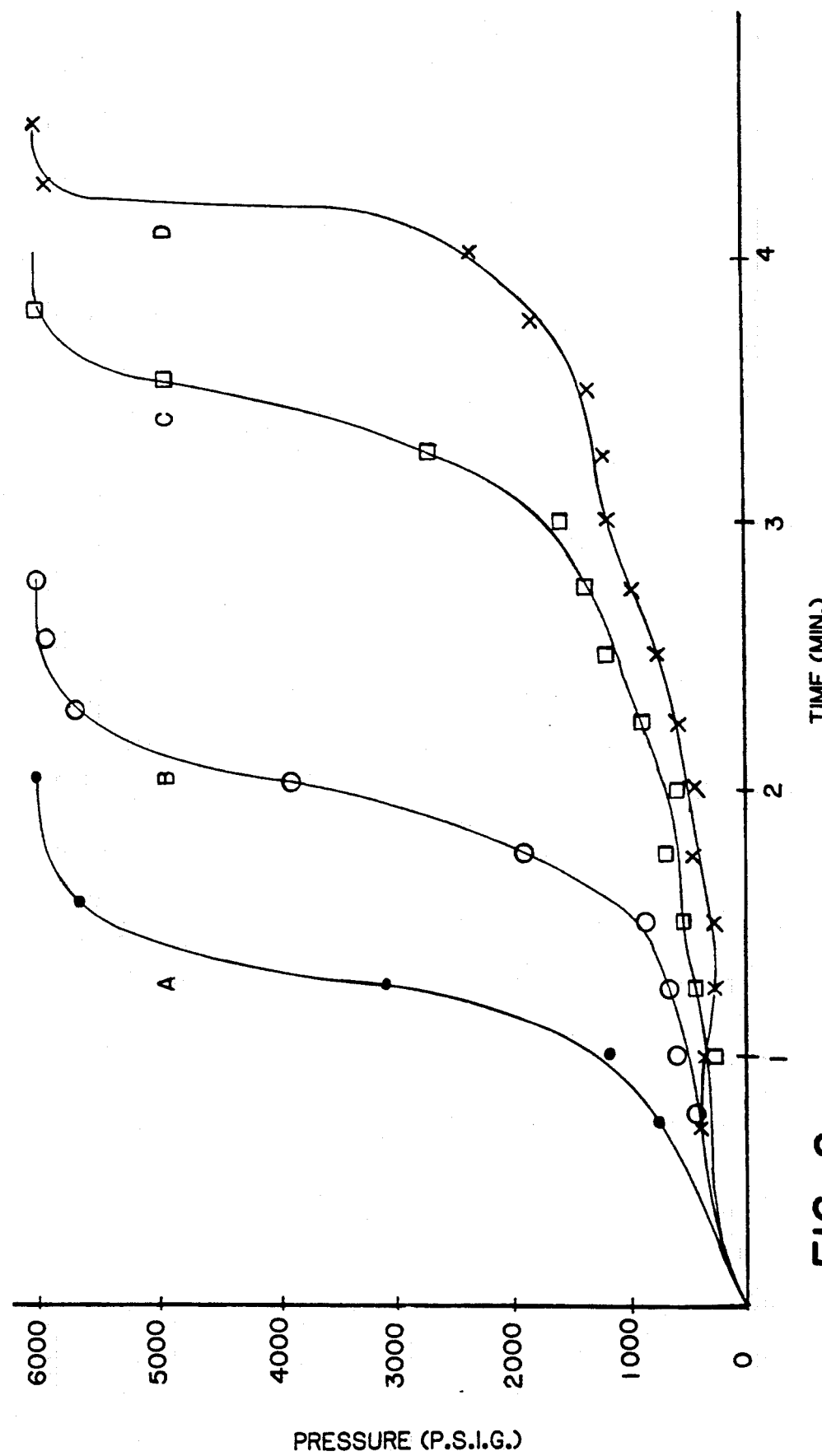
FIG. 2 is a graphical illustration of the effect of one of the components in a composition of this invention on one of the processing steps.

In contrast to that taught in U.S. Pat. No. 4,557,973, it is not necessary in the process described above to pretreat the glass wool with powdered gypsum prior to its use. Furthermore, the presence of the vast excess amount of water permits the gypsum slurry to flow out in the mold to a uniform thickness. In pressing the slurry to produce the green casting, care is required in order to prevent geysering, in which streams of slurry suddenly exit the mold with a great deal of force. This can be avoided by applying pressure slowly to the slurry. The amount of polymer binder in the slurry has an effect on the press time as shown in FIG. 2. The data shown in FIG. 2 were obtained from casting compositions of this invention prepared as set forth in Example 1.

EXAMPLE 1

Four casting compositions were prepared containing the following ingredients in parts by weight:

|  | Compositions | | | |
| --- | --- | --- | --- | --- |
| Ingredients | A | B | C | D |
| gypsum hemihydrate | 113 | 113 | 113 | 113 |
| newspaper | 20 | 20 | 20 | 20 |
| polymer binder$^a$ | 0 | 2.2 | 4.4 | 8.7 |
| water | 500 | 500 | 500 | 500 |

$^a$Polyvinyl acetate (UCAR 130)

The newspaper was pulped in a Waring blender; the gypsum and polymer binder were added, and the blended mixture was pressed into ¾ in. thick slabs at a rate to avoid geysering.

Figure 3:
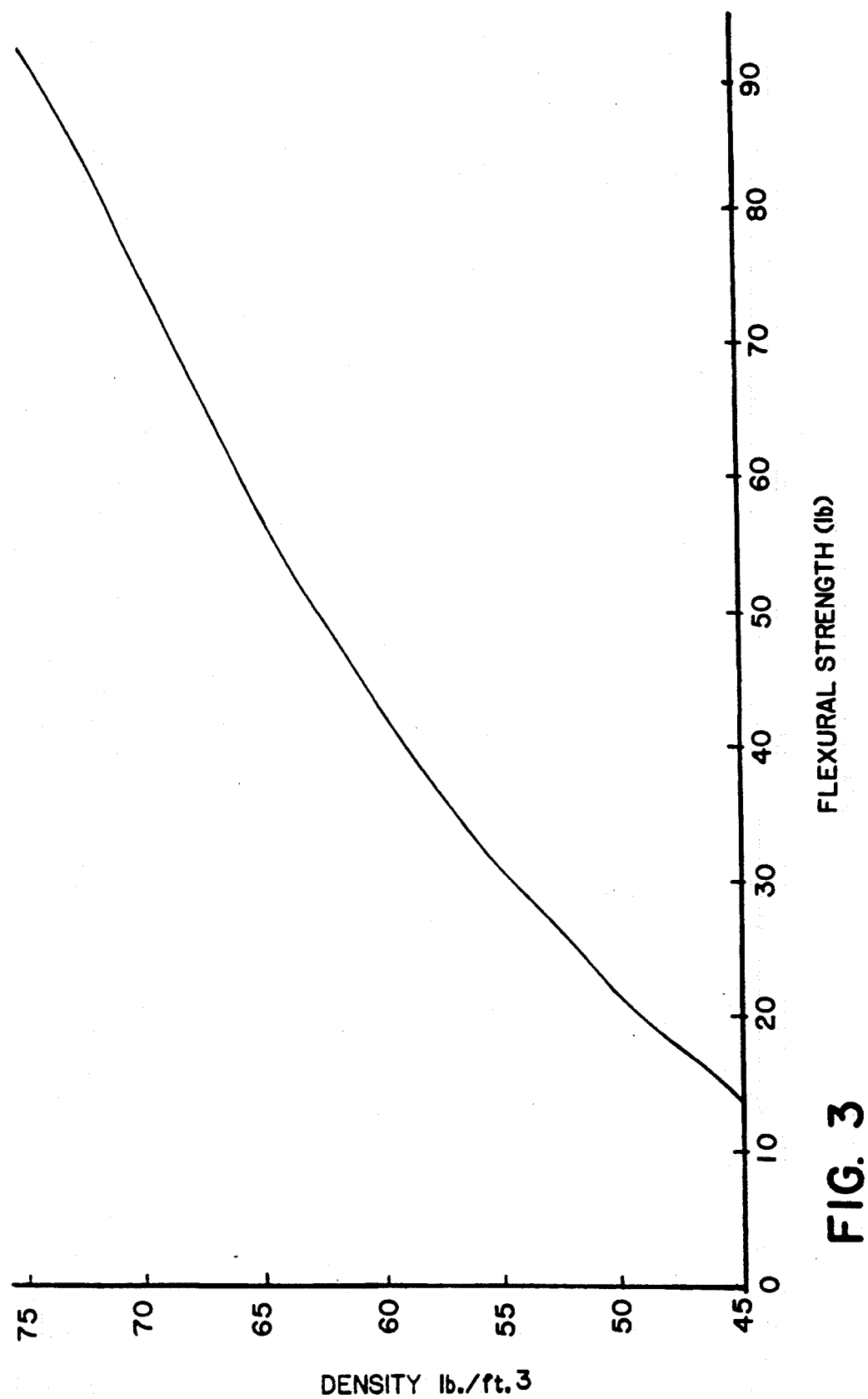
FIG. 3 graphically illustrates the flexural strength of a typical building material of this invention as a function of the density of the material.

Building materials within the scope of this invention, prepared by the process described hereinabove, were tested for flexural strength. These tests generally employed ASTM Method C 473-86a modified in that the specimens were ½ inch thick, 1 inch wide, and 4 inches long, with random orientation. In each case, the specimen was supported on bearings 3 inches apart, and the specimen was broken across the 1 inch width. Evaluation of flexural strength as a function of the density of some building materials was undertaken, and the results appear in FIG. 3. The flexural strength of building materials within the scope of this invention generally should be at least about 40 lb., preferably at least about 60 lbs. (½" thick sample).

Figure 4:
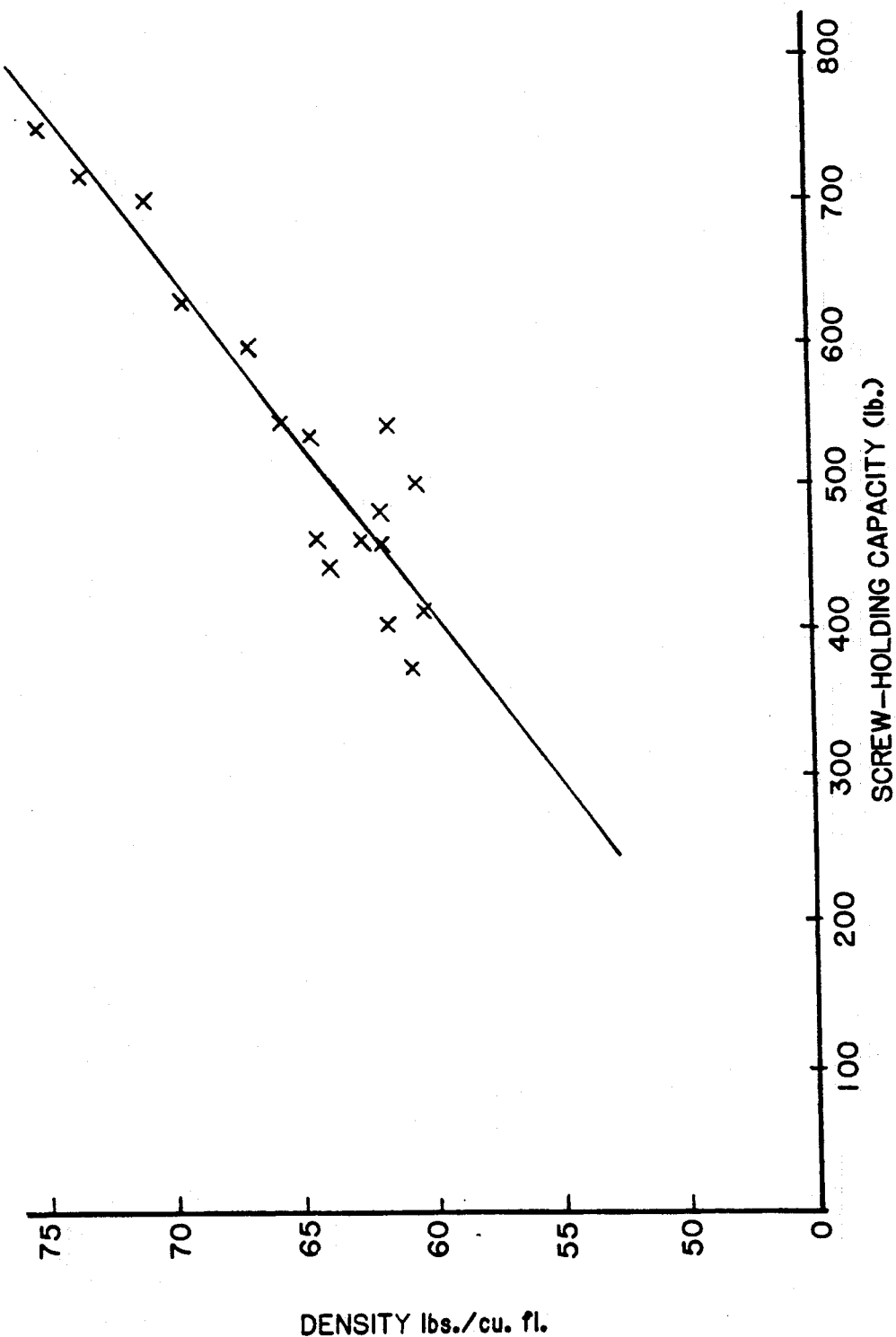
FIG. 4 graphically illustrates the screw-holding capacity of a typical building material of this invention as a function of the density of the material.

Building materials within the scope of this invention were evaluated for screw-holding capacity. In these tests, a specimen of material to be tested, dried to constant weight and ½"±1/32" thick, at least 9" long, and nominally 1 9/16" wide, was employed. At midwidth, a 5/32" pilot hole was drilled to receive a No. 12 sheet metal screw. With the specimen supported on a wooden block or steel plate and the pilot hole centered over a ⅝" hole in the support, the screw was turned until the full shank thickness penetrated the specimen. Force was then applied vertically at the center of the screw, forcing the screw through the specimen, and the force was noted. Evaluation of the screw-holding capacity of building materials within the scope of this invention was undertaken, as set forth in Example 2. The results appear in FIG. 4. In general, the screw-holding capacity of a building material within the scope of this invention should be at least about 400 lbs., and in a building board to be used as fire door edge banding, the screw-holding capacity should be at least about 700 lbs.

EXAMPLE 2

A casting composition was prepared containing the following ingredients in parts by weight:

| Ingredient | Quantity |
| --- | --- |
| gypsum hemihydrate | 113 |
| newspaper | 20 |
| water | 500 |

The newspaper was pulped in a Waring blender; the gypsum was added, and varying amounts of the blended mixture were added to a mold and pressed to ½ in. thick slabs. After curing and drying, the density and screw-holding capacity of each slab was measured.

The screw-holding capacity of the building materials of this invention is enhanced through the use of binder polymer as illustrated in Example 3.

EXAMPLE 3

In each case, the casting composition included 113 g calcined nonfibrous gypsum, 20 g paper, 2.2 g. glass textile fiber, and 5 g binder polymer.

| Binder Polymer | Product Density lbs./ft$^3$ | Screw-Holding Cap'y. lb. |
| --- | --- | --- |
| AIRFLEX 4530[a] | 67.5 | 749 |
| 4500 | 65.8 | 670 |
| 7522 | 68.6 | 730 |
| 4514 | 68.8 | 689 |
| UCAR 130[b] | 66.6 | 890 |
| GEN FLO 6500[c] | 68.9 | 718 |
| UCAR 376[d] | 71.6 | 678 |
| UCAR 417[e] | 66.7 | 650 |

Figures 5, 6:
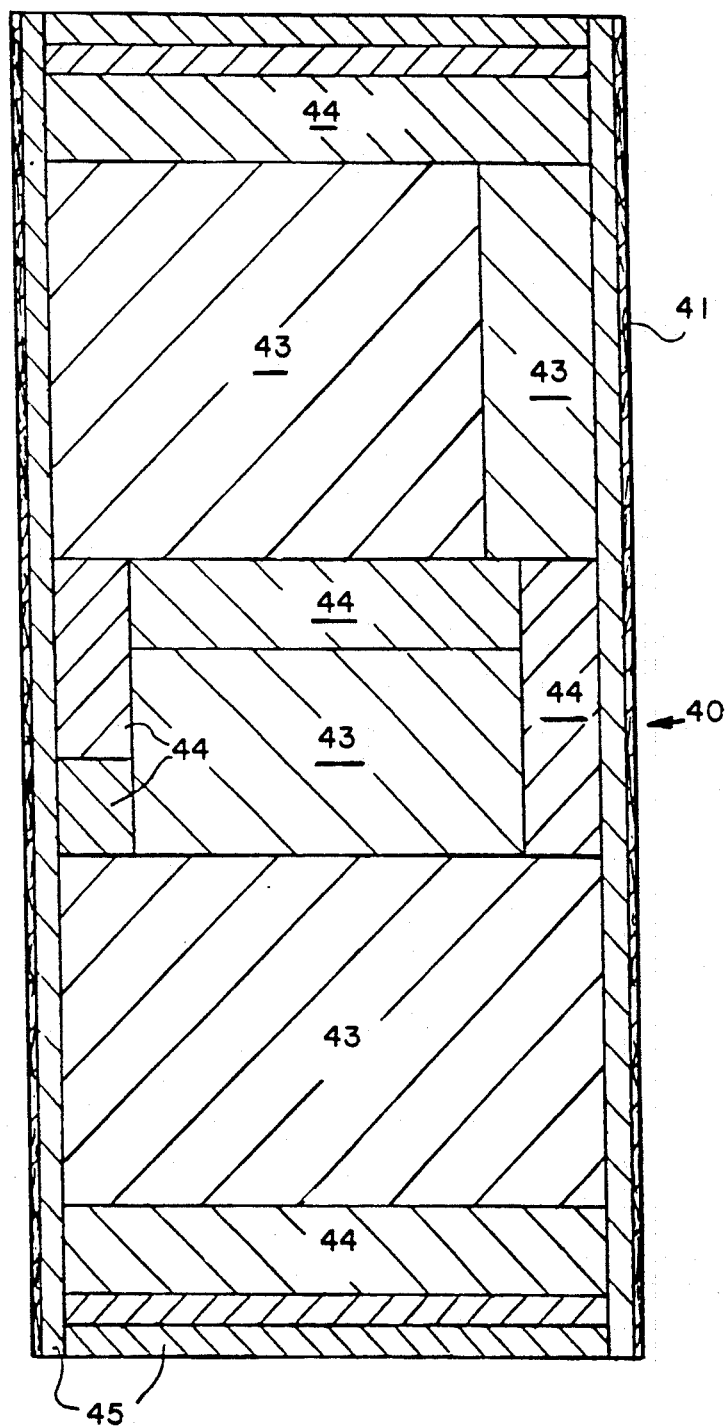
FIG. 5 is a top view of one of the fire doors within the scope of this invention.
FIG. 6 is a cross-sectional view taken along line 6—6 in FIG. 5.

[a]The AIRFLEX products are all ethylene/vinyl chloride
[b]Polyvinyl acetate homopolymer
[c]Styrene/butadiene
[d]Vinyl/acrylic
[e]Acrylic With reference now to FIGS. 5 and 6, a solid fire door 40, nominally 4 ft. wide and 8 ft. high, was constructed employing the core material 43 described in U.S. Pat. No. 4,159,302, which is incorporated herein by reference. The building board of this invention was utilized, not only in the edge banding 45, but also as blocking 44, to provide support for the latch mechanism, etc. The door facings 42 were made of birch veneer, ⅛" thick, and natural fir strips 41 were adhesively bonded to the vertical edge banding (stiles). The solid fire door 40 was tested in accordance with ASTM E-152, and the door achieved a 1.5 hr. fire endurance rating.

Figure 7:
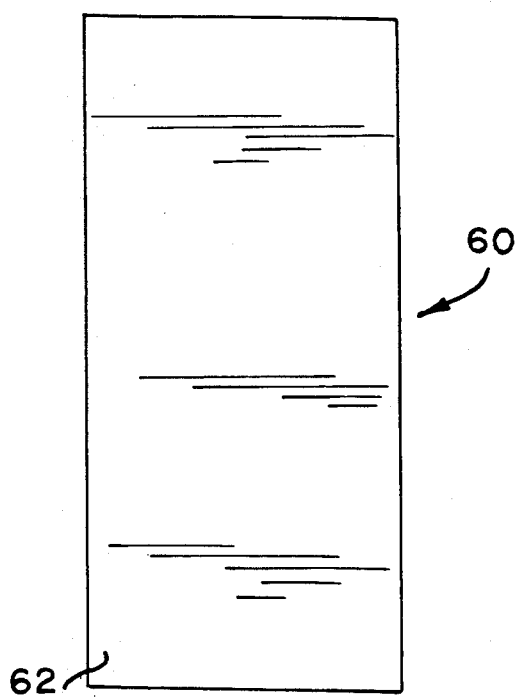
FIG. 7 is a front elevational view of another fire door within the scope of this invention.
Figure 8:
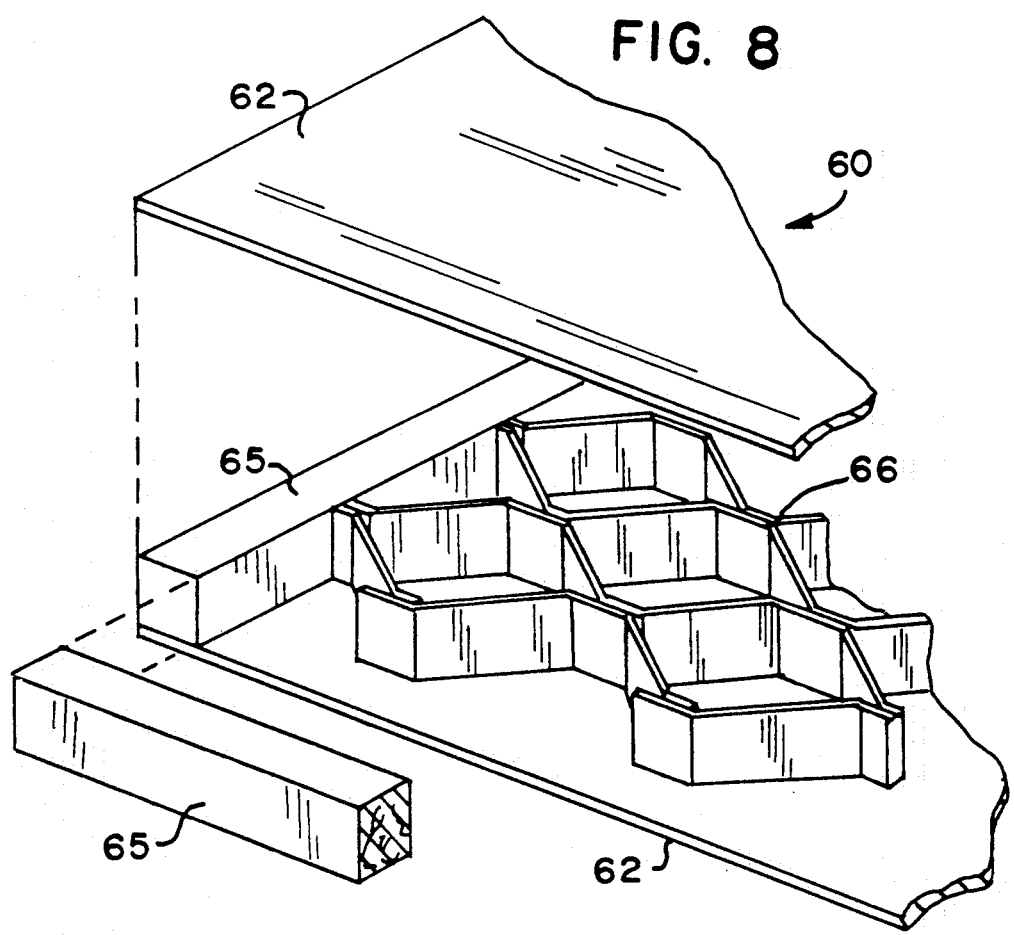
FIG. 8 is an isometric view of a corner of the fire door of FIG. 7 with portions broken away.

With reference now to FIGS. 7 and 8, a fire door having a partially hollow core was constructed along the lines of that shown in FIG. 5 of U.S. Pat. No. 4,811,538, the disclosure of which is incorporated herein by reference. The approximately 4 ft. wide and 8 ft. high door 60 differed, however, from the aforementioned patented door in that it did not contain a central gypsum core material of the type described in U.S. Pat. No. 4,811,538. The door 60 comprises natural fir edge banding 65 and facings 62 which are spaced with cardboard honeycomb 66, the whole assembly being adhesively secured together. Facings 62 were made from approximately ⅛ in. thick building panel material within the scope of this invention and having the following composition by weight:

| | |
| --- | --- |
| gypsum dihydrate | 83.9% |
| newspaper | 12.7% |
| glass textile fiber (¼ in.) | 0.4% |
| glass wool | 0.5% |
| poly(vinyl acetate)[a] | 2.5% |

[a]UCAR 130

The door so constructed was tested according to the method of ASTM E 152 and achieved a 20 min. fire endurance rating.

It will be evident that the compositions within the scope of this invention can be employed to make any number of different structural building materials, all within the scope of this invention, but not specifically enumerated hereinabove. Although several specific building products utilizing this invention have been named, many more will be evident to those skilled in the art. Such products include, for example, underlayment for plastic or ceramic counter tops; floor underlayment for ceramic tile, plastic or other floor covering; fire resistant roof sheathing (plywood); fire resistant wall panels; fire resistant panels for around furnaces, fireplaces, stoves and other heat emitting appliances; backer for wood or plastic veneer in furniture manufacturing; cross banding for fire rated doors; door skins for fire rated doors; fire resistant boards for safe liners; and fire resistant panels for lining elevator shafts.

What is claimed is:

1. A composition for preparing an unfaced, fire-resistant structural building material having density of at least about 60 lbs./cu. ft., flexural strength of at least about 40 lb. (½" thick material), and screw-holding capacity of at least about 400 lbs. comprising a substantially uniform dispersion of solids including by weight about 53% to about 78% nonfibrous calcium sulfate, about 7% to about 30% pulped paper fiber, and about 1.5% to about 35% performance booster selected from inorganic fiber, clay, vermiculite and binder polymer, together with a quantity of water at least about 25 times that required to completely hydrate the nonfibrous calcium sulfate.

2. A composition of claim 1 wherein said inorganic fiber includes siliceous fiber.

3. A composition of claim 2 which includes both glass textile fiber and glass wool.

4. A composition of claim 2 wherein said siliceous fiber comprises up to about 7% by weight of said solids.

5. A composition of claim 1 wherein said binder polymer includes an ester of polyvinyl alcohol.

6. A composition of claim 5 wherein said ester comprises up to about 15% by weight of said solids.

7. A composition of claim 1 wherein said performance booster includes both siliceous fiber and a binder polymer comprising an ester of polyvinyl alcohol.

8. A composition for preparing an unfaced, fire-resistant structural building material having density of at least about 60 lbs./cu. ft., flexural strength of at least about 40 lb. (½" thick material), and screw-holding capacity of at least about 400 lbs. comprising a substantially uniform dispersion of solids including by weight about 53% to about 78% nonfibrous calcium sulfate hemihydrate, about 7% to about 30% pulped waste paper, up to about 7% siliceous fiber, and up to about 15% ester of polyvinyl alcohol, together with a quantity of water at least about 25-fold in excess of that required to completely hydrate the calcined gypsum.

9. A composition according to claim 8 further comprising up to about 6% clay and up to about 6% unexpanded vermiculite.

10. A composition of claim 8 wherein said siliceous fiber includes both chopped glass textile fiber and glass wool.

11. An unfaced building board capable of use as edge banding in a fire door which achieves a 1.5 hr. fire endurance rating in accordance with ASTM E-152, which board comprises by weight about 68% to about 78% set gypsum derived from calcined nonfibrous gypsum, about 7% to about 30% pulped paper fiber, up to about 15% binder polymer, up to about 7% inorganic fiber, up to about 6% clay, and up to about 6% vermiculite, said board having a density of at least about 70 lbs./cu. ft., and a screw-holding capacity of at least about 700 lb., said board having been prepared with a quantity of water at least about 25-fold that required to completely hydrate the calcined gypsum.

12. A building board of claim 11 in which said inorganic fiber includes siliceous fiber.

13. A building board of claim 12 in which said siliceous fiber consists essentially of glass textile fiber.

14. A building board of claim 13 in which said glass textile fiber comprises about 2% by weight of said board.

15. A building board of claim 11 in which said binder polymer includes an ester of polyvinyl alcohol.

16. A building board of claim 15 in which said ester consists essentially of about 1% polyvinyl acetate by weight of said board.

17. A building board of claim 11 in which said inorganic fiber consists essentially of glass textile fiber and said binder polymer consists essentially of polyvinyl acetate.

18. An unfaced building panel capable of use as facing in a hollow-core fire door which achieves a 20 min. fire endurance rating when tested in accordance with ASTM E-152, which panel comprises by weight about 75% to about 90% set gypsum derived from calcined nonfibrous gypsum, about 10% to about 14% pulped paper fiber, up to about 9% binder polymer, and about 0.8% to about 2% inorganic fiber, said board having a density of at least about 60 lbs./cu. ft., said board having been prepared with a quantity of water at least about 25-fold times that required to completely hydrate the calcined gypsum.

19. The building panel of claim 18 in which said inorganic fiber includes both glass textile fiber and glass wool.

20. The building panel of claim 19 in which said glass textile fiber comprises less than about 1% of said panel by weight and said glass wool comprises about 0.3% by weight to about 1.5% by weight of said board.

21. The building panel of claim 19 in which said glass wool is incorporated into said board without preblending with gypsum.

22. The building panel of claim 18 in which said binder polymer is an ester of polyvinyl alcohol.

23. The building panel of claim 22 in which said ester consists essentially of about 8% polyvinyl acetate by weight of said panel.

24. The building panel of claim 18 in which said inorganic fiber consists essentially of both glass textile fiber and glass wool and said binder polymer consists essentially of polyvinyl acetate.

25. An unfaced, fire-resistant structural building material which includes by weight about 65% to about 90% set gypsum dihydrate derived from gypsum hemihydrate, about 7% to about 30% pulped paper fiber, and up to about 1.5% to about 35% performance booster selected from inorganic fiber, clay, vermiculite and binder polymer, said product having density of at least about 60 lbs./cu. ft., flexural strength of at least 40 lb. (½" thick material), and screw-holding capacity of at least about 400 lbs., said board having been prepared with a quantity of water at least about 25-fold times that required to completely hydrate the calcined gypsum.

26. The building material of claim 25 wherein said inorganic fiber includes siliceous fiber.

27. The building material of claim 26 wherein said siliceous fiber includes both glass textile fiber and glass wool, and said glass wool is incorporated without pretreatment.

28. The building material of claim 26 wherein said siliceous fiber comprises up to about 7% by weight of said solids.

29. The building material of claim 25 wherein said binder polymer includes an ester of polyvinyl acetate.

30. The building material of claim 29 wherein said ester comprises up to about 15% by weight.

31. The building material of claim 25 wherein said performance booster includes both siliceous fiber and an ester of polyvinyl alcohol.

32. A building material according to claim 25 from which edge banding and facings for fire doors can be constructed, the resultant fire doors having fire endurance ratings of 1.5 hr. and 20 min., respectively, when tested according to ASTM E-152.

33. A building material comprising by weight:
at least about 65% set gypsum dihydrate derived substantially from gypsum hemihydrate; and
paper fibers derived substantially from pulped paper, said fibers being disposed substantially homogeneously throughout said set gypsum dihydrate by mixing said pulped paper and gypsum hemihydrate with a quantity of water at least about 25-fold times that required to completely hydrate the gypsum hemihydrate.

34. The building material of claim 32, wherein said paper fibers are pulped in at least about 20 times their weight of water.

* * * * *

UNITED STATES PATENT AND TRADEMARK OFFICE
CERTIFICATE OF CORRECTION

PATENT NO. : 5,171,366

DATED : December 15, 1992

INVENTOR(S) : Turner W. Richards, Hubert C. Francis, George F. Fowler

It is certified that error appears in the above-identified patent and that said Letters Patent is hereby corrected as shown below:

Col. 1, line 18, beginning of the line, change "0.7 gm cm$^3$)," to --0.7 gm/cm$^3$),--

Col. 3, line 13, after "a" and before "of" change "jack" to --lack--

Col. 3, line 58, after "fiber" and before "less" insert a parenthesis, i.e., --(less--

Col. 4, line 15, after "at" change "east" to --least--

Col. 9, line 67, after "samples" and before "pressed" change "Were" to --were--

Signed and Sealed this

Seventh Day of December, 1993

*Attest:*

BRUCE LEHMAN

*Attesting Officer*   *Commissioner of Patents and Trademarks*